United States Patent
Gerard et al.

(10) Patent No.: US 9,719,442 B2
(45) Date of Patent: Aug. 1, 2017

(54) METHOD AND DEVICE FOR HEATING FUEL FOR AN INTERNAL COMBUSTION ENGINE

(71) Applicant: RENAULT s.a.s., Boulogne-Billancourt (FR)

(72) Inventors: David Gerard, Paris (FR); Fano Rampanarivo, Antony (FR); Pascal Emery, Palaiseau (FR)

(73) Assignee: RENAULT s.a.s, Boulogne-Billancourt (FR)

( * ) Notice: Subject to any disclaimer, the term of this patent is extended or adjusted under 35 U.S.C. 154(b) by 21 days.

(21) Appl. No.: 14/758,897

(22) PCT Filed: Feb. 17, 2014

(86) PCT No.: PCT/FR2014/050318
§ 371 (c)(1),
(2) Date: Jul. 1, 2015

(87) PCT Pub. No.: WO2014/128392
PCT Pub. Date: Aug. 28, 2014

(65) Prior Publication Data
US 2015/0337776 A1    Nov. 26, 2015

(30) Foreign Application Priority Data
Feb. 25, 2013    (FR) ..................... 13 51645

(51) Int. Cl.
*F02D 41/06*    (2006.01)
*F02D 41/02*    (2006.01)
(Continued)

(52) U.S. Cl.
CPC .......... *F02D 41/064* (2013.01); *B60W 10/06* (2013.01); *B60W 10/08* (2013.01); *B60W 20/15* (2016.01);
(Continued)

(58) Field of Classification Search
CPC ...... F02D 41/064; F02D 41/021; F02D 29/02; B60W 10/08; B60W 20/00; B60W 10/06;
(Continued)

(56) References Cited

U.S. PATENT DOCUMENTS 4,351,301 A    9/1982    Allen
6,059,016 A *  5/2000    Rafalovich ........ B60H 1/00492
                                                    165/10

(Continued)

FOREIGN PATENT DOCUMENTS

| DE | 203 00 189 U1 | 6/2004 |
| FR | 2 164 780 A1 | 8/1973 |
| FR | 2 481 751 A1 | 6/1981 |

OTHER PUBLICATIONS

International Search Report issued Jun. 12, 2014, in PCT/FR2014/050318, filed Feb. 17, 2014.

(Continued)

*Primary Examiner* — Redhwan K Mawari
*Assistant Examiner* — Edward Torchinsky
(74) *Attorney, Agent, or Firm* — Oblon, McClelland, Maier & Neustadt. L.L.P.

(57) ABSTRACT

A method for heating fuel upon start-up of a hybrid vehicle combustion engine, in which method temperature of fuel and temperature outside the vehicle are compared against a first threshold below which starting of the vehicle is forbidden, and against a second threshold higher than the first threshold and above which the engine will start without the fuel being heated. The fuel is heated by exchange of heat with a cooling circuit for the vehicle battery when the external temperature is between the two thresholds.

12 Claims, 2 Drawing Sheets

(51) Int. Cl.
*B60W 10/08* (2006.01)
*F02N 11/08* (2006.01)
*F02N 19/04* (2010.01)
*F02M 31/16* (2006.01)
*F02D 29/02* (2006.01)
*B60W 10/06* (2006.01)
*B60W 30/194* (2012.01)
*B60W 20/15* (2016.01)
*B60K 1/00* (2006.01)

(52) U.S. Cl.
CPC .......... *B60W 30/194* (2013.01); *F02D 29/02* (2013.01); *F02D 41/021* (2013.01); *F02M 31/16* (2013.01); *F02N 11/0837* (2013.01); *F02N 19/04* (2013.01); *B60K 2001/005* (2013.01); *B60W 2510/246* (2013.01); *B60W 2560/00* (2013.01); *B60W 2710/08* (2013.01); *F02D 2200/0414* (2013.01); *F02D 2200/0606* (2013.01); *F02N 2200/122* (2013.01); *Y02T 10/126* (2013.01); *Y02T 10/48* (2013.01)

(58) Field of Classification Search
CPC .......... B60W 30/194; B60W 2560/00; B60W 2710/08; F02M 31/16; F02N 11/0837; F02N 19/04; Y02T 10/48; Y02T 10/126
See application file for complete search history.

(56) References Cited

U.S. PATENT DOCUMENTS

| | | | | |
|---|---|---|---|---|
| 6,705,101 | B2* | 3/2004 | Brotz | B60H 1/00 62/198 |
| 7,147,071 | B2* | 12/2006 | Gering | B60H 1/00278 165/164 |
| 2005/0167169 | A1 | 8/2005 | Gering et al. | |
| 2008/0078542 | A1* | 4/2008 | Gering | B60H 1/00278 165/202 |
| 2012/0125278 | A1* | 5/2012 | Ries-Mueller | B60W 10/06 123/142.5 R |
| 2013/0140001 | A1* | 6/2013 | Mandl | F28F 27/02 165/96 |
| 2013/0269911 | A1* | 10/2013 | Carpenter | F28D 1/0408 165/104.13 |
| 2014/0338376 | A1* | 11/2014 | Carpenter | B60L 1/003 62/115 |

OTHER PUBLICATIONS

French Preliminary Search Report issued Dec. 6, 2013, in Patent Application No. FR 1351645, filed Feb. 25, 2013.

* cited by examiner

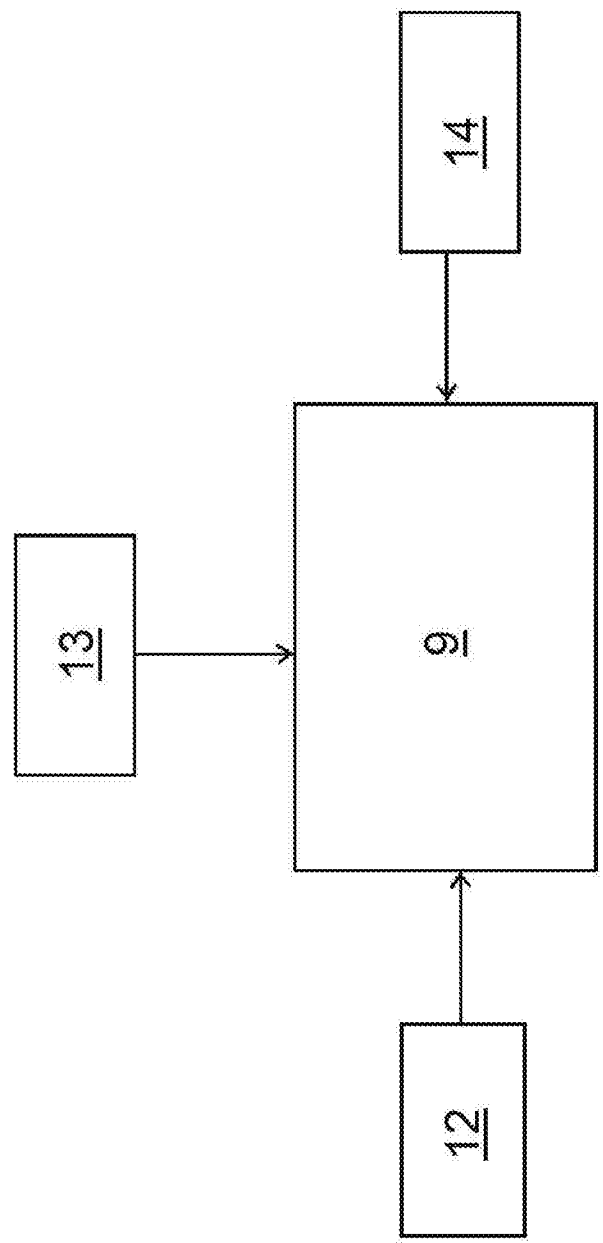

METHOD AND DEVICE FOR HEATING FUEL FOR AN INTERNAL COMBUSTION ENGINE

The present invention relates to heating the fuel used by an internal combustion engine.

More specifically, it relates to a method for heating fuel upon start-up of a vehicle combustion engine, in which the temperature of the fuel and the temperature outside the vehicle are compared against a first threshold beneath which the vehicle is prevented from starting up, and against a second threshold higher than the first, beyond which the engine is started without the fuel being heated.

It also relates to a fuel heating device between the fuel tank and the combustion engine of a vehicle, and a hybrid vehicle fitted with such a device.

This invention is preferably but not exclusively used in hybrid vehicles combining an electric motor with a combustion engine.

When cold-starting combustion engines, it may be necessary to provide calories to the fuel in order to heat same and facilitate start-up of the vehicle. This heating requirement relates to the fuel in direct-injection diesel engines, such as the fuel used in compression-ignition engines.

Sufficient calories must be provided when starting the engine to limit fuel waxing and prevent clogging of the diesel filter, which causes pressure drops in the feed manifold, which may result in instability, stalling and even failure to start.

According to a first known solution, the heating of the diesel may be based on the recovery of calories provided by the injection system. The principle involves causing the fuel to flow in a short loop toward the inlet of the diesel filter.

Another known solution is based on the provision of calories via an electric heater installed on the fuel circuit. The principle involves generating thermal energy by supplying a conductive material with an electrical current.

It has already been proposed to provide a genuine heating device on the fuel supply circuit. The publication FR 2 481 751 notably describes a fuel supply network for a diesel engine comprising a fuel heating device powered by the battery of the vehicle, between the pump and the injection system of the engine.

Currently, the reduction of $CO_2$ emissions requires optimization of the electricity consumption of vehicles. The diesel heating solution must therefore be efficient, without adversely affecting consumption during the vehicle start-up phase. The solution described in the publication cited has the drawback of consuming a large amount of electricity. Furthermore, it is not suitable for hybrid vehicle architectures, which enable new starting strategies.

The present invention is intended to exploit the significant quantities of heat released during operation by hybrid vehicle traction batteries to assist heating of the combustion engine during the start-up phase of same.

For this purpose, it proposes that the fuel be heated by heat exchange with the cooling circuit of the battery of the vehicle, if the outside temperature is between two temperature thresholds.

Preferably, the heating of the fuel is stopped once the outside temperature or the temperature of the fuel exceeds the second higher threshold.

According to the invention, the fuel is heated by passing through a heat exchanger traversed by the cooling water circuit of a battery of the vehicle.

Other features and advantages of the invention will become clear upon reading the description below of a nonlimiting embodiment of same, provided with reference to the attached drawing.

FIG. 2 is a schematic view of the sensors in the system.

Figure 1:
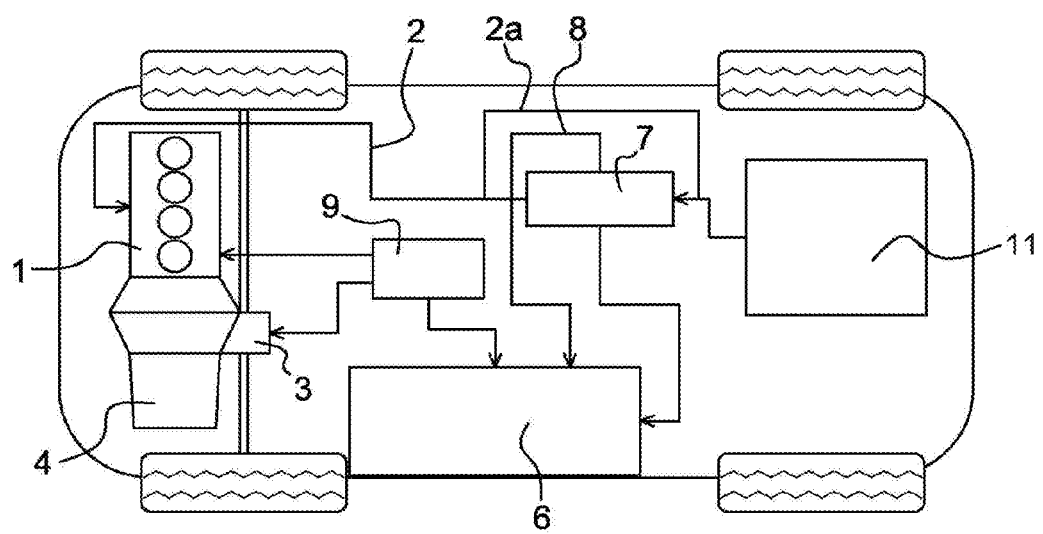
FIG. 1 is a schematic view of the general architecture of the system.

The hybrid architecture of the diagram includes a combustion engine 1 and the fuel supply circuit 2 of same. An electric traction machine 3 is coupled or otherwise (using coupling means, not shown) to the combustion engine 1 and to the transmission 4 of the vehicle. An electric traction battery 6 supplies electricity to the electric machine 3. It is connected to a heat exchanger 7 by a cooling circuit 8. The assembly of components of the architecture is controlled by monitoring means 9. The main fuel circuit, between the fuel tank 11 and the combustion engine 2, passes through the heat exchanger 7. It has a bypass 2a about same.

As shown in FIG. 2, the device has a plurality of sensors, including a fuel-temperature sensor 12, an outside-temperature sensor 13, and a battery-cooling-water temperature sensor 14. The signals from all of the sensors are received by the monitoring means 9.

The assembly is controlled as follows: in normal operation, the combustion engine 1, the electric traction machine 3 and the respective fuel and electricity supplies of same are controlled by the monitoring means 9.

In start-up phase, if the measured outside temperature T_ext is below a first threshold T_GO_lim1 (T_ext<T_GO_lim1), it is not possible to start the combustion engine, because the fuel is blocked. The vehicle can only move under the effect of the electric machine. It has to move in electric mode.

The monitoring means also set a second fuel temperature threshold T_GO_lim2, which is higher than the outside temperature. If the outside temperature is between the two thresholds (T_GO_lim1<T_extérieure<T_GO_lim2), there are two situations.

If the temperature of the fuel T_GO is below the second threshold (T_GO <T_GO_lim2), the vehicle can be driven either in electric mode or in combustion mode, as a function of the decision made by the monitoring means 9 and other operating conditions. The cooling water for the battery flows through the related cooling circuit. Cooling is controlled by a water-temperature sensor 14 (FIG. 2), for example. The fuel temperature sensor 12 (FIG. 2) measures the temperature of the fuel in the fuel supply circuit of the combustion engine. In this zone, the fuel usually needs to be heated to start, since the temperature of the fuel is in principle equal to the outside temperature when the vehicle is started. In this case, the exchanger is in operation and calories are exchanged between the cooling circuit and the fuel supply circuit. The fuel is heated by this heat exchange, facilitating the starting of the combustion engine.

The heating of the fuel is stopped once the outside temperature or the temperature of the fuel exceeds the second threshold:

a) if the temperature of the fuel exceeds the second threshold (T_GO>T_GO_lim2), the fuel is warm enough. It is no longer necessary to heat same. The exchanger can be bypassed.

b) if the outside temperature exceeds the second threshold (T_GO_lim2<T_extérieure), the fuel is warm enough to start, and need not be heated. The exchanger can be bypassed.

In summary, the temperature of the fuel and the temperature outside the vehicle are compared against a first threshold beneath which the vehicle is prevented from starting up, and against a second threshold higher than the first, above which the engine is started without the fuel being heated. Between the two thresholds, the fuel is heated by heat exchange with the cooling circuit of the battery of the vehicle.

Finally, the exchanger between the battery cooling circuit and the fuel supply circuit for the combustion engine can also exchange heat with the hot portion of the fuel circuit (not shown in the diagram), which is the return circuit to the fuel tank. The fuel return circuit then passes through the heat exchanger, such that the heat exchanger can also be used to limit the heating of the fuel returning from the injectors or the high-pressure pump to the tank.

The advantages of this invention are numerous, and notably include the benefit of starting the combustion engine as a function of the outside temperature and use of the battery cooling circuit to help heat the fuel on starting and to increase the quality of the start of the combustion engine.

In the case of a hybrid vehicle, illustrated as a nonlimiting example in the diagram, with at least one combustion engine 1 and an electric machine 3 powered by a traction battery provided with a cooling water circuit, it can move using only the electric drive source 3 of same, if the temperature of the fuel is less than the second threshold. The combustion engine is then started when the vehicle is moving, once the temperature of the fuel has reached this threshold.

The invention claimed is:

1. A method for heating fuel upon start-up of a vehicle combustion engine, the method comprising:
    comparing temperature of fuel against a first threshold beneath which the vehicle is prevented from starting up, and against a second threshold higher than the first threshold and above which the engine is started without the fuel being heated; and
    heating the fuel by heat exchange with a cooling circuit of a battery of the vehicle when the temperature of the fuel is between the two thresholds.

2. The fuel heating method as claimed in claim 1, wherein the heating of the fuel is stopped once the temperature of the fuel exceeds the second threshold.

3. The fuel heating method as claimed in claim 1, wherein the cooling circuit of the battery is used to limit heating of fuel returning from the engine via a return circuit of same to a tank.

4. The fuel heating method as claimed in claim 1, wherein the vehicle moves using only an electric drive source if the temperature of the fuel is less than the second threshold.

5. The fuel heating method as claimed in claim 4, wherein the combustion engine is started when the vehicle is moving, once the temperature of the fuel has reached the second threshold.

6. A fuel heating device between a fuel tank and a combustion engine of a vehicle, comprising:
    a fuel temperature sensor;
    an outside temperature sensor; and
    a heat exchanger;
    wherein fuel is heated by passing through the heat exchanger traversed by a cooling water circuit of a battery of the vehicle when temperature of the fuel is between a first threshold and a second threshold, the vehicle prevented from starting up beneath the first threshold, and the second threshold being higher than the first threshold and above which the engine is started without the fuel being heated.

7. The fuel heating device as claimed in claim 6, wherein the fuel circuit includes a bypass for the heat exchanger.

8. The fuel heating device as claimed in claim 6, wherein the fuel return circuit also passes through the heat exchanger to make it possible to limit temperature of fuel returning from the engine to the tank.

9. The fuel heating device as claimed in claim 6, further comprising a battery-cooling-water temperature sensor.

10. A hybrid vehicle comprising at least one combustion engine and an electric machine powered by a traction battery including a cooling water circuit, and a fuel heating device as claimed in claim 6.

11. A method for heating fuel upon start-up of a vehicle combustion engine, the method comprising:
    comparing temperature outside the vehicle against a first threshold beneath which the vehicle is prevented from starting up, and against a second threshold higher than the first threshold and above which the engine is started without the fuel being heated; and
    heating the fuel by heat exchange with a cooling circuit of a battery of the vehicle when the outside temperature is between the two thresholds.

12. The fuel heating method as claimed in claim 11, wherein the heating of the fuel is stopped once the outside temperature exceeds the second threshold.

* * * * *